United States Patent
Park

(10) Patent No.: US 10,182,196 B2
(45) Date of Patent: Jan. 15, 2019

(54) METHOD OF PROCESSING IMAGE OF ELECTRONIC DEVICE AND ELECTRONIC DEVICE THEREOF

(71) Applicant: Samsung Electronics Co., Ltd., Gyeonggi-do (KR)

(72) Inventor: Byeong-Chan Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/279,804

(22) Filed: Sep. 29, 2016

(65) Prior Publication Data

US 2017/0099444 A1 Apr. 6, 2017

(30) Foreign Application Priority Data

Oct. 6, 2015 (KR) .................. 10-2015-0140305

(51) Int. Cl.
*H04N 5/232* (2006.01)
*H04N 5/345* (2011.01)
*H04N 5/347* (2011.01)

(52) U.S. Cl.
CPC ......... *H04N 5/345* (2013.01); *H04N 5/23229* (2013.01); *H04N 5/347* (2013.01); *H04N 5/23219* (2013.01); *H04N 5/23293* (2013.01)

(58) Field of Classification Search
CPC .... H04N 5/345; H04N 5/23229; H04N 5/347; H04N 5/23212; H04N 5/23293;
(Continued)

(56) References Cited

U.S. PATENT DOCUMENTS

| 7,315,631 B1* | 1/2008 | Corcoran | ........... | G06K 9/00234 |
| | | | | 382/118 |
| 7,916,897 B2* | 3/2011 | Corcoran | ........... | G06K 9/00228 |
| | | | | 382/103 |

(Continued)

FOREIGN PATENT DOCUMENTS

JP 2007-058282 A 3/2007

OTHER PUBLICATIONS

International Search Report, dated Dec. 28, 2016.
(Continued)

*Primary Examiner* — Pritham D Prabhakher
(74) *Attorney, Agent, or Firm* — Cha & Reiter, LLC

(57) ABSTRACT

According to various embodiments of the present disclosure, an electronic device includes: a camera module that obtains an image; and a processor which implements the method, including setting a quadrangular area in the obtained image including a reference pixel and a corresponding pixel disposed respectively at corners of the quadrangular area, calculating an accumulated-pixel value for each pixel of the obtained image corresponding to the quadrangular area, such that a particular pixel value for a particular pixel is a sum of the pixel values beginning from the reference pixel, continuing though an arrangement of pixels in the quadrangular area and terminating at the particular pixel, and generating an image quality processing-dedicated frame of accumulated-pixel values based on calculated accumulated-pixel values of each pixel of the frame.

18 Claims, 15 Drawing Sheets

(58) Field of Classification Search
CPC .......... H04N 5/367; H04N 7/18; H04N 9/375; H04N 9/045; H04N 9/735; G02B 7/365; G06K 9/00771; G06K 9/621; G06K 9/00228; G06K 9/6257
USPC .................................................... 348/364
See application file for complete search history.

(56) References Cited

U.S. PATENT DOCUMENTS

| | | | | |
|---|---|---|---|---|
| 8,805,081 | B2* | 8/2014 | Chotard | G06K 9/6257 |
| | | | | 382/190 |
| 8,948,469 | B2* | 2/2015 | Yamashita | G09B 5/00 |
| | | | | 382/118 |
| 9,076,035 | B2* | 7/2015 | Tanaka | G06K 9/6254 |
| 9,292,751 | B2* | 3/2016 | Miyagawa | B60R 1/00 |
| 9,342,894 | B1* | 5/2016 | Gopalakrishnan | H04N 1/393 |
| 9,400,929 | B2* | 7/2016 | Matsumoto | G06T 7/73 |
| 9,466,121 | B2* | 10/2016 | Yang | G06T 19/006 |
| 9,741,099 | B2* | 8/2017 | Lim | G06T 5/001 |
| 9,767,539 | B2* | 9/2017 | Zamfir | G06K 9/00248 |
| 9,940,533 | B2* | 4/2018 | Govil | G06K 9/605 |
| 2006/0140612 | A1 | 6/2006 | Yata | |
| 2008/0037838 | A1* | 2/2008 | Ianculescu | G06K 9/00228 |
| | | | | 382/118 |
| 2009/0002489 | A1 | 1/2009 | Yang et al. | |
| 2009/0147099 | A1 | 6/2009 | Kim et al. | |
| 2009/0175533 | A1* | 7/2009 | Sabe | G06K 9/00248 |
| | | | | 382/159 |
| 2009/0256926 | A1* | 10/2009 | Okada | G06K 9/00221 |
| | | | | 348/222.1 |
| 2009/0303342 | A1 | 12/2009 | Corcoran et al. | |
| 2009/0324087 | A1* | 12/2009 | Kletter | G06K 9/4671 |
| | | | | 382/195 |
| 2010/0110222 | A1 | 5/2010 | Smith et al. | |
| 2010/0272363 | A1* | 10/2010 | Steinberg | G06K 9/00228 |
| | | | | 382/190 |
| 2011/0299783 | A1 | 12/2011 | Chotard et al. | |
| 2012/0019683 | A1* | 1/2012 | Susanu | G06K 9/00228 |
| | | | | 348/222.1 |
| 2012/0050566 | A1 | 3/2012 | Cote et al. | |
| 2013/0004028 | A1* | 1/2013 | Jones | G06K 9/00228 |
| | | | | 382/118 |
| 2013/0243329 | A1* | 9/2013 | Oro Garcia | G06K 9/00973 |
| | | | | 382/195 |
| 2014/0071241 | A1 | 3/2014 | Yang et al. | |
| 2015/0016684 | A1* | 1/2015 | Matsumoto | G06K 9/3233 |
| | | | | 382/103 |
| 2015/0242694 | A1 | 8/2015 | Miyagawa | |
| 2016/0035104 | A1* | 2/2016 | Bigioi | G06T 7/2006 |
| | | | | 348/208.1 |
| 2016/0371862 | A1* | 12/2016 | Silver | G06T 11/008 |

OTHER PUBLICATIONS

Cho, et al.; "FPGA-Based Face Detection System Using Haar Classifiers"; FPGA'09; Feb. 2009.
European Search Report dated Jun. 18, 2018.

* cited by examiner

METHOD OF PROCESSING IMAGE OF ELECTRONIC DEVICE AND ELECTRONIC DEVICE THEREOF

CLAIM OF PRIORITY

This application claims the priority under 35 U.S.C. § 119(a) to Korean Application Serial No. 10-2015-0140305, which was filed in the Korean Intellectual Property Office on Oct. 6, 2015, the entire content of which is hereby incorporated by reference.

TECHNICAL FIELD

The present disclosure relates to an image processing method and an electronic device thereof.

BACKGROUND

Generally, a digital signal processor (DSP) is a hardware device that performs image processing. For example, the DSP may execute "3A" processing (e.g., auto exposure or "AE", auto white balance or "AWB", and auto focus or "AF"), to improve the quality of images captured through a digital camera. To do so, the DSP may set a predetermined area within an image, sometimes referred to as a 'block' (or a 'region of interest' or "ROI"). For example, a single block may be set for AF processing in an image. Similarly plurality of blocks may be set for AWB processing or AE processing in an image. Subsequently, the DSP may execute image processing on the set block to generate image quality processing-dedicated data on image data in the block.

SUMMARY

Generally, an image obtained through a camera may be distinguished based on a vertical drive (VD) signal generated from an image sensor. FIG. 15A may show a single block for AF processing, whereas FIG. 15B may show a plurality of blocks for AWB or AE processing. Also, image processing executed on the captured image may be performed in the order of operations in which the DSP sets a block, the image sensor receives light, and the DSP performs image processing on the image corresponding to the part where the block is set. For example, as illustrated in FIG. 16, image quality processing-dedicated data is obtained based on the summation of pixel values of a previously set block part in an image that is obtained by an image sensor and is data-processed.

When the amount of time expended for performing the operations (e.g., light exposure, data processing, and image quality processing-dedicated data obtaining) to obtain the image quality processing-dedicated data is 1VD, at least 2VD time is generally expended to perform operations from setting a block to obtaining, from an image obtained through a camera, image quality processing-dedicated data of a part in which the block is set, according to FIG. 17.

A recent technological trend in enhancing camera image quality includes promptly predicting the movement of a subject, and generating an image based on a corresponding algorithm. However, setting a block, receiving light through an image sensor, and performing data processing on an image where the block is set requires at least 2VD time, and thus, a large amount of time is spent performing image processing, which is a disadvantage.

Also, when a fixed block is set in an image, image data may be extracted from the fixed area, and thus, it is difficult to embody a flexible algorithm associated with an image quality. Referring to FIG. 18, in one example, a single image processing operation for extracting image quality processing-dedicated data may extract image quality processing-dedicated data associated with a block 181 that is set in advance, but may not extract image quality processing-dedicated data associated with areas 183, 185, and 187 in addition to the block 181 that is set in advance, unlike the example of the bottom figure of FIG. 18. For example, when the reliability of image quality processing-dedicated data extracted from a predetermined block is low, or when image quality processing-dedicated data extracted through an algorithm is undesirable image quality processing-dedicated data, image quality processing on an image may be processed through the data of an adjacent area of the block. However, a system that sets a fixed block may not be capable of performing the above processing.

Also, in one example, 3A data obtained according to 3A processing of the DSP is a value corresponding to a block part set in advance. To obtain image quality processing-dedicated data of another block part, the other block part needs to be set and at least 2VD time is utilized to obtain image quality processing-dedicated data, which is a drawback from the perspective of time. Therefore, the DSP does not allow the frequent changing of a block that is set, and thus, the algorithm for 3A processing is designed to be inflexible, which is a drawback.

Accordingly, various embodiments of the present disclosure provide an image processing method and an electronic device thereof, which is capable of obtaining 3A data without setting a block of an image obtained through a camera before extracting image quality processing-dedicated data of the image, so as to reduce the amount of time expended for image processing.

Also, various embodiments of the present disclosure provide a flexible algorithm for enhancing the image quality of an image obtained through a camera, so as to apply various image quality algorithms, and thus, increase the image quality of the image obtained through the camera.

According to embodiments of the present disclosure, an electronic device is provided including a camera module for obtaining an image and a processor to perform: setting a quadrangular area in the obtained image including a reference pixel and a corresponding pixel disposed respectively at corners of the quadrangular area, calculating an accumulated-pixel value for each pixel of the obtained image corresponding to the quadrangular area, such that a particular pixel value for a particular pixel is a sum of the pixel values beginning from the reference pixel, continuing though an arrangement of pixels in the quadrangular area and terminating at the particular pixel, and generating an image quality processing-dedicated frame of accumulated-pixel values based on calculated accumulated-pixel values of each pixel of the image.

According to embodiments of the present disclosure, an image processing method includes obtaining an image through a camera module of the electronic device, setting a quadrangular area in the obtained image including a reference pixel and a corresponding pixel disposed respectively at corners of the quadrangular area, calculating an accumulated-pixel value for each pixel of the obtained image corresponding to the quadrangular area, such that a particular pixel value for a particular pixel is a sum of the pixel values beginning from the reference pixel, continuing through an arrangement of pixels in the quadrangular area and terminating at the particular pixel, and generating an image quality processing-dedicated of accumulated-pixel values based on calculated accumulated-pixel values of each pixel of the image.

According to embodiments of the present disclosure, an electronic device is disclosed including a camera module that obtains an image, and a processor, configured to perform: generating an image quality processing-dedicated frame with respect to the obtained image based on the obtained image, and setting at least one of: a first region of interest disposed within the image using the generated image quality processing-dedicated image, and a second region of interest having a size or disposed at a location differing from at least one of a size and location of the first region of interest, respectively.

According to embodiments of the present disclosure, an image processing method is disclosed, including obtaining an image through a camera module of the electronic device, generating by a processor an image quality processing-dedicated image with respect to the obtained image based on the obtained image, and setting at least one of: a first region of interest disposed within the image using the generated image quality processing-dedicated image, and a second region of interest having a size or disposed at a location differing from at least one of a size and location of the first region of interest, respectively.

An image processing method and an electronic device thereof, according to various embodiments of the present disclosure, may obtain 3A data without setting a block with respect to an image obtained through a camera, and thus, may overcome a problem in which at least 2VD time is utilized to perform image processing. For example, an image quality processing-dedicated frame is generated for each frame of an image obtained through a camera, and thus, a series of operations for obtaining image quality processing-dedicated data of a shot image with respect to a block to be generated do not need to be performed every time that a block is newly generated (or every time that at least one of the location or the size of a block is changed). According to various embodiments of the present disclosure, image quality processing-dedicated data with respect to a block to be generated in associated with an image may be readily obtained by using an image quality processing-dedicated frame that is generated in advance. Through the advantage from the perspective of time, when an operation of enhancing the image quality of an image obtained through a camera is executed by tracing a moving subject, a block may be promptly predicted and the accuracy of image quality processing on an image may be improved.

BRIEF DESCRIPTION OF THE DRAWINGS

The above and other aspects and features of the present disclosure will be more apparent from the following detailed description taken in conjunction with the accompanying drawings, in which.

DETAILED DESCRIPTION

Figure 1:
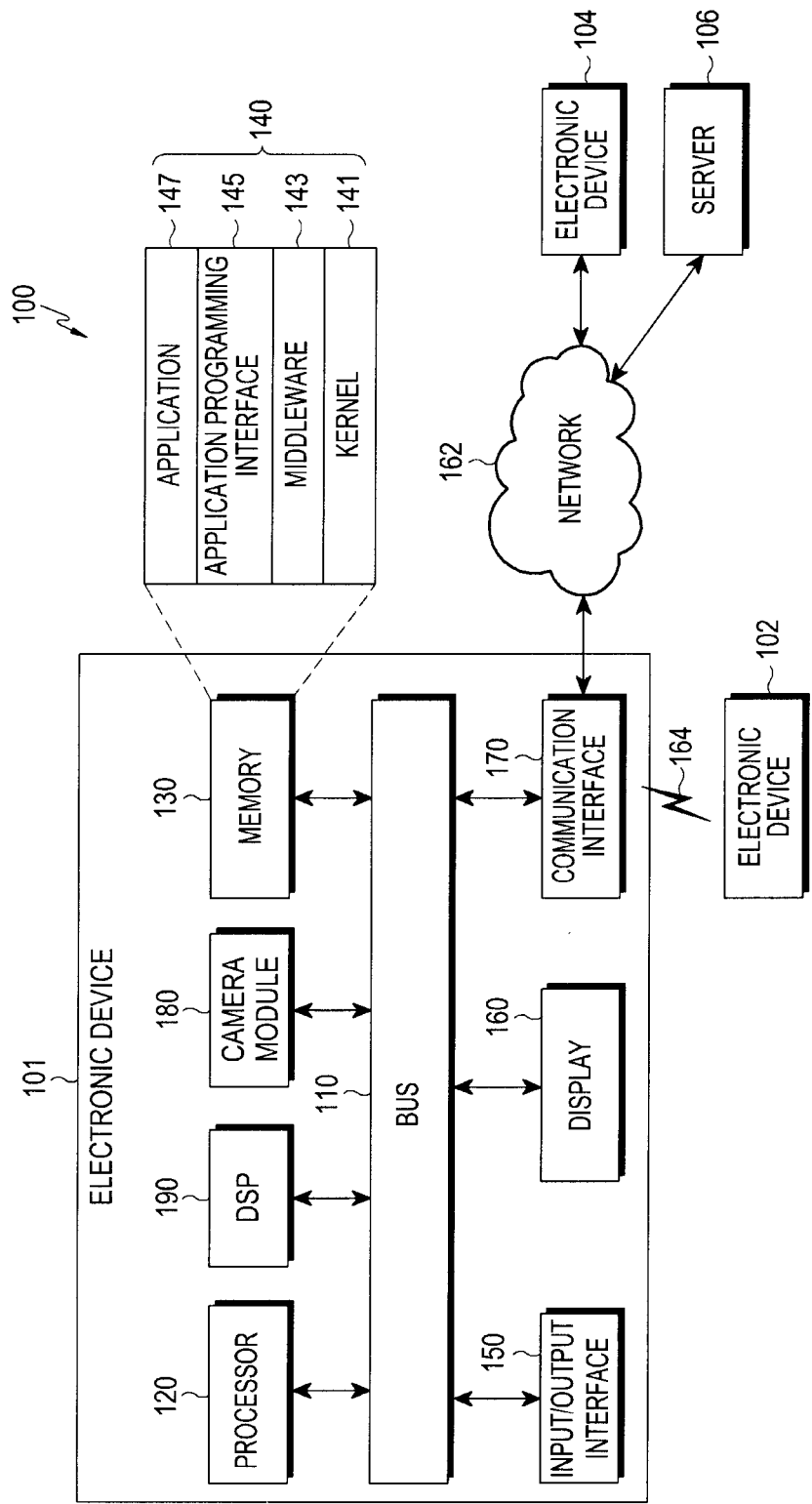
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™, a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, a communication interface 170, a camera module 180, and a digital signal processor (DSP) 190. In some embodiments of the present disclosure, the electronic device 101 may omit at least one of the components, or may further include other components.

The bus 110 may include, for example, a circuit that interconnects the components 110 to 170 and delivers communication (e.g., a control message and/or data) between the components 110 to 170.

The processor 120 may include one or more of a central processing unit (CPU), an application processor (AP), and a communication processor (CP). For example, the processor 120 may control at least one other component of the electronic device 101 and/or may carry out operations or data processing related to communication.

The memory 130 may include a volatile memory and/or a non-volatile memory. The memory 130 may store, for example, commands or data related to one or more other components of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, the memory 130, or the like) used for executing an operation or function implemented by other programs (e.g., the middleware 143, the API 145, or the application(s) 147). Furthermore, the kernel 141 may provide an interface through which the middleware 143, the API 145, or the application programs 147 may access individual components of the electronic device 101 to control or manage system resources.

The middleware 143 may function as, for example, an intermediary for allowing the API 145 or the application programs 147 to communicate with the kernel 141 to exchange data.

Further, the middleware 143 may process one or more task requests received from the application programs 147 according to priorities thereof. For example, the middleware 143 may assign priorities to at least one of the application programs 147 in association with using system resources (e.g., the bus 110, the processor 120, the memory 130 or the like) of the electronic device 101. For example, the middleware 143 may perform scheduling, load balancing, or the like on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, block control, image processing, text control, or the like.

For example, the input/output interface 150 may serve as an interface that may transfer commands or data input from a user or another external device to other component (s) of the electronic device 101. Furthermore, the input/output interface 150 may output the commands or data received from the other component(s) of the electronic device 101 to a user or another external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of contents (e.g., text, images, videos, icons, or symbols) to a user. The display 160 may include a touch screen and receive, for example, a touch, gesture, proximity, or hovering input using an electronic pen or a user's body part.

The communication interface 170, for example, may set communication between the electronic device 101 and an external device (e.g., a external electronic device 102, an external electronic device 104, or a server 106). For example, the communication interface 170 may be connected to a network 162 through wireless or wired communication to communicate with an external device (e.g., the second external electronic device 104 or the server 106).

The wireless communication may use at least one of, for example, long term evolution (LTE), LTE-Advance (LTE-A), code division multiple access (CDMA), wideband CDMA (WCDMA), universal mobile telecommunications system (UMTS), WiBro (Wireless Broadband), and global system for mobile communications (GSM), as a cellular communication protocol. Further, the wireless communication may include, for example, short-range communication 164. The short-range communication 164 may include, for example, at least one of Wi-Fi, Bluetooth, near field communication (NFC), global navigation satellite system (GNSS), and the like. The GNSS may include at least one of, for example, a global positioning system (GPS), a global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include at least one of, for example, a universal serial bus (USB), a high definition multimedia interface (HDMI), Recommended Standard 232 (RS-232), and a plain old telephone service (POTS). The network 162 may include at least one of a telecommunication network, such as a computer network (e.g., a LAN or a WAN), the Internet, and a telephone network.

Each of the first and second external electronic devices 102 and 104 may be of a type that is identical to, or different from, that of the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (e.g., the electronic devices 102 and 104 or the server 106). According to an embodiment of the present disclosure, when the electronic device 101 should perform some functions or services automatically or by request, the electronic device 101 may make a request for performing at least some of the functions related to the functions or services to another device (e.g., the electronic device 102 or 104 or the server 106) instead of, or in addition to, performing the functions or services by itself. The other electronic device (e.g., the electronic device 102 or 104, or the server 106) may carry out the requested functions or additional functions and transfer the result thereof to the electronic device 101. The electronic device 101 may provide the received result as it is or additionally process the received result and provide the requested functions or services. To this end, for example, cloud computing, distributed computing, or client-server computing technology may be used.

The camera module 180 may obtain an image. For example, the camera module 180 may shoot a still image and a video. For example, the camera module 180 may include an optical unit (not illustrated), a lens driving unit (not illustrated), an image sensor (not illustrated), and CDS/AGC/ADC (not illustrated).

The optical unit may include a lens (not illustrated) and a shutter (not illustrated). The optical unit may be driven by the lens driving unit and may shoot an image. Also, the lens of the optical unit is driven by the lens driving unit, and may perform zooming-in, focusing, and the like.

The image sensor may sense an image shot by the optical unit, and may convert the same into an electrical signal. The image sensor may be a complementary metal-oxide-semiconductor (CMOS) or a charge coupled device (CCD) sensor, and may be a sensor that is capable of sensing an image that is higher than or equal to the ultra high definition (UHD) level.

The CDS/AGC/ADC removes noise from an output signal of the image sensor using a correlated double sampling circuit (CDS), adjusts a gain to maintain the level of a signal to be constant using an auto gain controlling circuit (AGC), and converts an analog signal into a digital signal using an analog to digital converter (ADC).

The DSP 190 may reduce the size of an image obtained through the camera module 180. For example, through techniques, such as sub-sampling, binning, or the like, the size of the image obtained through the camera module 180 may be reduced.

The sub-sampling is an image processing technique that converts an image formed of pixels, provided in a predetermined size, into a smaller size. Also, binning is an image processing technique that obtains a high quality image through the summation of the pixel values of adjacent pixels in the image.

The DSP 190 may perform data processing on the obtained image, so as to generate image quality data with respect to the image (or the image of which the size is reduced) of the obtained image.

The image quality data may include, for example, AF data for auto focus (AF), AWB data for auto white balance (AWB), or AE data for auto exposure (AE).

For example, the data processing may filter the obtained image, may extract the edge part of a subject, and may generate an image, so as to generate image quality data associated with AF data. Also, for example, the data processing may perform pre-processing, such as dividing the obtained image into a designated number of parts, or the like, so as to generate image quality data associated with AWB data or AE data.

The AF data may be, for example, a value that may be obtained by filtering the obtained image, extracting an edge part, and adding up the values of the extracted edge part. Also, the AWB data may be, for example, an average value of each of R, G, and B, which is calculated by adding up the pixels of the obtained image. Also, the AE data may be, for example, an average value of each of R, G, and B, which is calculated by adding up the pixels of the obtained image.

When the AWB data or the AE data is generated, data processing on the obtained image may be omitted based on the performance, the capacitance, and the like of the DSP 190.

The DSP 190 may generate an image quality processing-dedicated frame of the frame (or a frame of which the size is reduced or a data-processed frame) of the obtained image. For example, the DSP 190 may calculate, for each pixel of the obtained image, an accumulated pixel value by adding up the pixel values of pixels in a quadrangular area (also referred to as a block or a region of interest) that takes a corresponding pixel and a reference pixel of the obtained image as corners. Also, the DSP 190 may generate an image quality processing-dedicated frame including the calculated accumulated-pixel value corresponding to each pixel of the obtained image. All of the accumulated pixel values included in the image quality processing-dedicated frame may be regarded as image quality processing-dedicated data. Accordingly, it is construed that the DSP 190 generates image quality processing-dedicated data of the obtained image, so as to generate the image quality data.

When the size of the generated image quality processing-dedicated frame is large, the size of a memory inside the electronic device increases, which is a drawback. To solve the problem, the DSP 190 may reduce the size of the generated image quality processing-dedicated frame. For example, the size of the generated image quality processing-dedicated frame may be reduced using a technique, such as sub-sampling, binning, or the like.

According to an embodiment of the present disclosure, the DSP 190 may obtain the data of a first quadrangular area (also referred to as a region of interest or a block) including at least one pixel, from the generated image quality processing-dedicated frame (or image quality processing-dedicated frame of which the size is reduced).

The operation of obtaining the data of the first quadrangular area may be performed through, for example, adding a second pixel that is in contact in the diagonal direction with a pixel that utilizes, as a boundary, a second corner disposed in the diagonal direction to a first corner in the first quadrangular area, from among the pixels external to the first quadrangular area, to a pixel value of a first pixel in the first quadrangular area that utilizes the first corner, which is farthest from the reference pixel in the first quadrangular area, as a boundary; subtracting, from the sum, a third pixel that is in contact in the diagonal direction with a pixel that utilizes, as a boundary, a third corner in the first quadrangular area, from among the pixels outside the first quadrangular area; and subtracting, from the sum, a fourth pixel that is in contact in the diagonal direction with a pixel that utilizes, as a boundary, a fourth corner in the first quadrangular area, from among the pixels outside the first quadrangular area.

By using the method of obtaining the data of the first quadrangular area, image processing for enhancing the image quality of a predetermined area of the obtained image may be readily performed. For example, the obtained data of the first quadrangular area may have a value that is identical to a value obtained by adding up all of the pixel values in a quadrangular area of the obtained image corresponding to the first quadrangular area. Accordingly, the value obtained by adding up the pixel values of a predetermined area of the obtained image may be readily obtained. Also, an average value of the pixel values of the obtained image, which corresponds to the first quadrangular area, may be readily obtained by dividing the data of the first quadrangular area by the area of the first quadrangular area.

Although FIG. 1 and the above-described embodiment express the processor 120 and the DSP 190 as separate components, the processor 120 may include the DSP 190. Accordingly, the processor 120 may perform the following operations.

According to various embodiments of the present disclosure, the processor 120 calculates, for each pixel of the obtained image, an accumulated-pixel value by adding up the pixel values of the pixels in a quadrangular area that takes a corresponding pixel and a reference pixel of the frame as corners; and generates an image quality processing-dedicated frame of accumulated pixel values including the calculated accumulated-pixel value corresponding to each pixel of the frame.

According to various embodiments of the present disclosure, the processor 120 may be configured to reduce the size of the generated image quality processing-dedicated frame using sub-sampling or binning.

According to various embodiments of the present disclosure, the processor 120 may reduce the size of the frame using sub-sampling or binning.

According to various embodiments of the present disclosure, the processor 120 may perform data processing on the frame, so as to generate image quality data associated with the frame.

According to various embodiments of the present disclosure, the image quality data may include auto focus data, auto white balance data, or auto exposure data.

According to various embodiments of the present disclosure, the processor 120 may generate an image quality processing-dedicated frame with respect to the obtained image using the obtained image; and may set a first region of interest in the obtained image using the generated image quality processing-dedicated frame, or may set a second region of interest having the size or location that is different from at least one of the size and location of the first region of interest.

The second region of interest may be set when the result of a reliability test of the first region of interest shows that the first region of interest fails to satisfy a designated standard.

According to various embodiments of the present disclosure, the processor 120 may obtain the data of the first region of interest, which includes at least one pixel, from the generated image quality processing-dedicated frame. The operation of obtaining the data of the first region of interest may include: adding a second pixel that is in contact in the diagonal direction with a pixel that takes, as a boundary, a second corner disposed in the diagonal direction to a first corner in the first region of interest, out of the pixels outside the first region of interest, to a pixel value of a first pixel in the first region of interest that takes the first corner, which is the farthest from the reference pixel in the first region of interest, as a boundary; subtracting, from the sum, a third pixel that is in contact in the diagonal direction with a pixel that takes, as a boundary, a third corner in the first region of interest, out of the pixels outside the first region of interest; and subtracting, from the sum, a fourth pixel that is in contact in the diagonal direction with a pixel that takes, as a boundary, a fourth corner in the first region of interest, out of the pixels outside the first region of interest.

According to various embodiments of the present disclosure, the processor 120 may obtain the data of the second region of interest including at least one pixel from the generated image quality processing-dedicated frame. The operation of obtaining the data of the second region of interest may include: adding a sixth pixel that is in contact in the diagonal direction with a pixel that takes, as a boundary, a sixth corner disposed in the diagonal direction to a fifth corner in the second region of interest, out of the pixels outside the second region of interest, to a pixel value of the fifth pixel in the second region of interest that takes the fifth corner, which is the farthest from the reference pixel in the second region of interest, as a boundary; subtracting, from the sum, a seventh pixel that is in contact in the diagonal direction with a pixel that takes, as a boundary, a seventh corner in the second region of interest, out of the pixels outside the second region of interest; and subtracting, from the sum, an eighth pixel that is in contact in the diagonal direction with a pixel that takes, as a boundary, an eighth corner in the second region of interest, out of the pixels outside the second region of interest.

Figure 2:
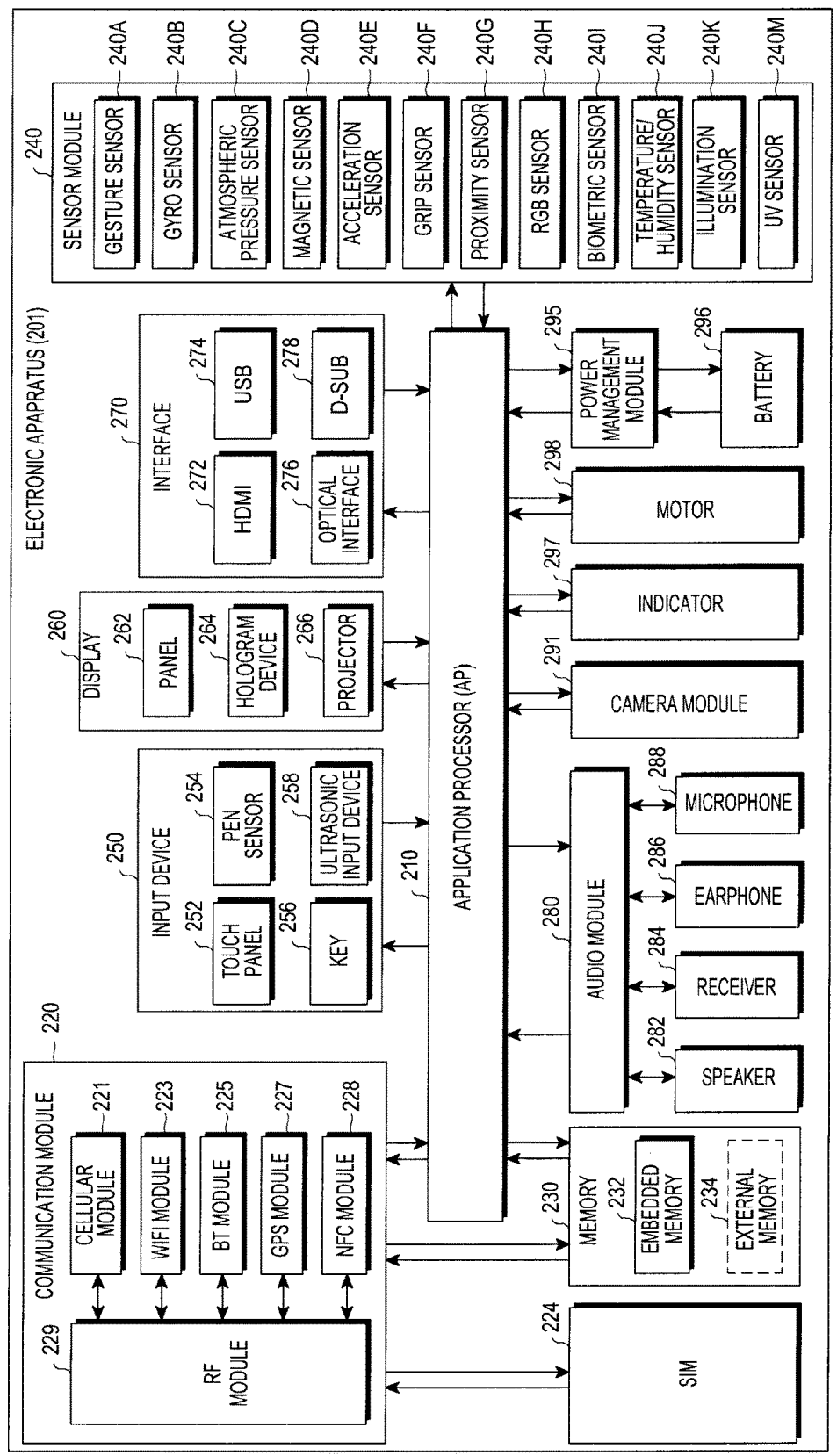
FIG. 2 is a block diagram of an electronic device according to various embodiments of the present disclosure.

FIG. 2 is a block diagram illustrating an electronic device 201 according to various embodiments of the present disclosure. The electronic device 201 may include, for example, an entirety or part of the electronic device 101 illustrated in FIG. 1. The electronic device 201 may include at least one application processor (AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and may perform various types of data processing and calculations. The processor 210 may be embodied as, for example, a System on Chip (SoC). According to an embodiment of the present disclosure, the processor 210 may further include a graphic processing unit (GPU) and/or an image signal processor. The processor 210 may also include at least some (e.g., a cellular module 221) of the components illustrated in FIG. 2. The processor 210 may load commands or data received from at least one of the other components (e.g., a non-volatile memory) in a volatile memory, may process the loaded commands or data, and may store various types of data in a non-volatile memory.

The communication module 220 may have a configuration that is equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

For example, the cellular module 221 may provide a voice call, an image call, a text message service, an Internet service, and the like through a communication network. According to an embodiment of the present disclosure, the cellular module 221 may identify or authenticate an electronic device 201 in the communication network by using the subscriber identification module (e.g., a SIM card) 224. According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to embodiments of the present disclosure, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (e.g., an RF signal). The RF module 229 may include, for example, a transceiver, a power amplifier module (PAM), a frequency filter, a low noise amplifier (LNA), and an antenna. According to another embodiment of the present disclosure, at least one of the cellular module 221, the Wi-Fi module 223, the Bluetooth module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded memory 232 or an external memory 234. The embedded memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard driver, or a solid state drive (SSD).

The external memory 234 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Further, the touch panel 252 may further include a control circuit. The touch panel 252 may further include a tactile layer to provide a tactile reaction to a user.

The (digital) pen sensor 254 may include, for example, a recognition sheet, which is a part of the touch panel or separated from the touch panel. The key 256 may include, for example, a physical button, an optical key or a keypad. The ultrasonic input device 258 may detect ultrasonic waves generated by an input tool through a microphone (e.g., a microphone 288), and determine data corresponding to the detected ultrasonic waves.

The display 260 (e.g., the display 160) may include a panel 262, a hologram device 264, or a projector 266. The panel 262 may include a configuration that is identical or similar to that of the display 160 illustrated in FIG. 1. The panel 262 may be embodied to be, for example, flexible, transparent, or wearable. The panel 262 may be formed, as a single module, to be integrated with the touch panel 252. The hologram device 264 may show a three dimensional image in the air by using the interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 shown in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert, for example, a sound and an electrical signal. At least some components of the audio module 280 may be included in, for example, the input/output interface 150 illustrated in FIG. 1. The audio module 280 may process sound information that is input or output through, for example, a speaker 282, a receiver 284, earphones 286, the microphone 288, or the like.

The camera module 291 is, for example, a device that may shoot a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp). The camera module 291 may include, for example, the camera module 180 of FIG. 1.

The power management module 295 may manage, for example, power of the electronic device 201. According to an embodiment of the present disclosure, the power management module 295 may include a power management integrated circuit (PMIC), a charger integrated circuit (IC), or a battery or fuel gauge. The PMIC may use a wired and/or wireless charging method. The wireless charging method may include, for example, a magnetic resonance scheme, a magnetic induction scheme, or an electromagnetic scheme, and may further include an additional circuit for wireless charging, such as a coil loop circuit, a resonance circuit, a rectifier circuit, and the like. The battery gauge may measure, for example, a residual quantity of the battery 296, and a voltage, a current, or a temperature during the charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into mechanical vibration, and may generate vibration, a haptic effect, or the like. Although not illustrated, the electronic device 201 may include a processing device (e.g., a GPU) for supporting a mobile TV. The processing device for supporting a mobile TV may, for example, process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
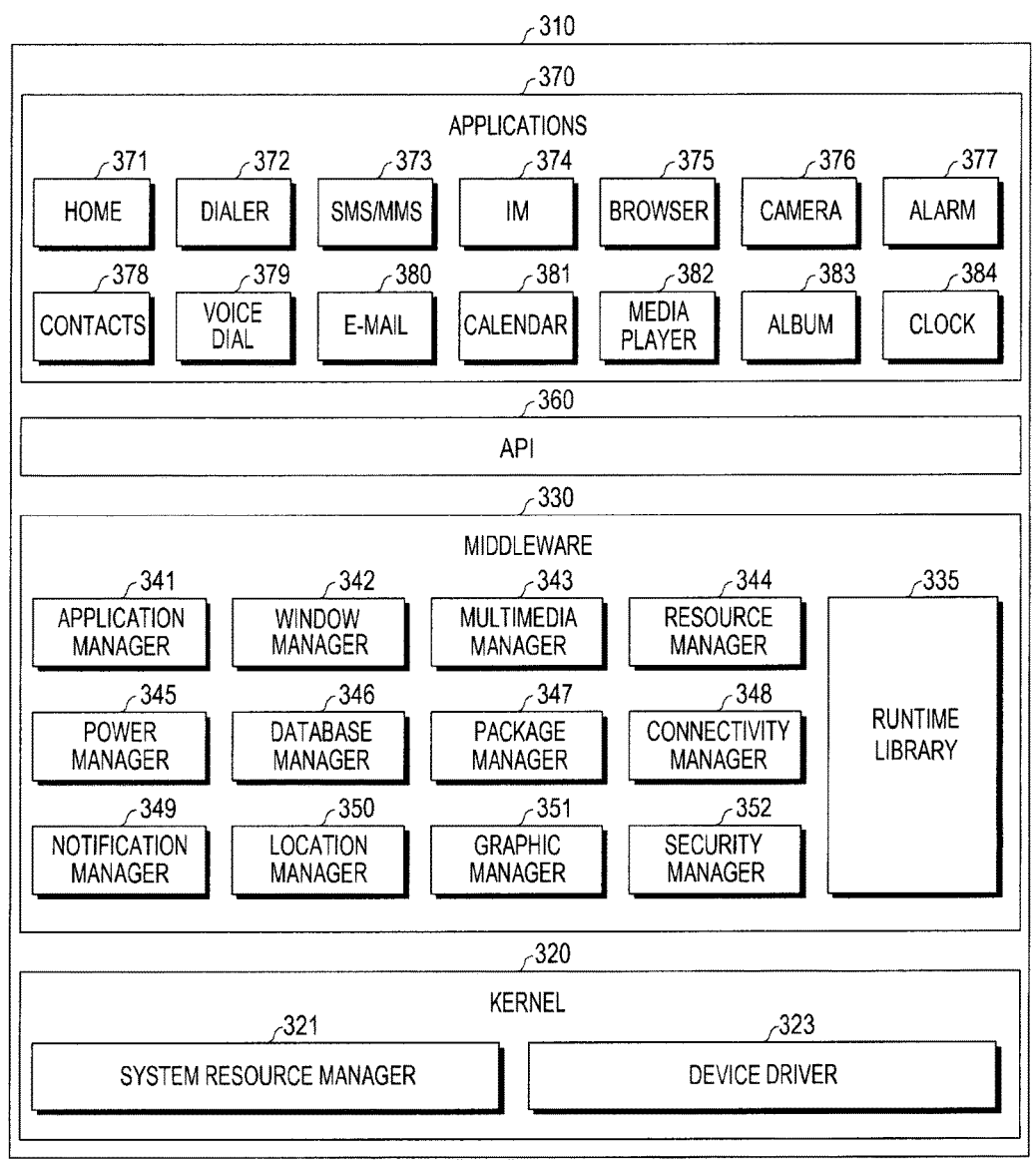
FIG. 3 is a block diagram of a programming module according to various embodiments of the present disclosure.

FIG. 3 is a block diagram of a program module according to various embodiments of the present disclosure. According to an embodiment of the present disclosure, the program module 310 (e.g., the program 140) may include an operating system (OS) that controls resources relating to an electronic device (e.g., the electronic device 101) and/or various applications (e.g., the application programs 147) running on the operating system. The operating system may be, for example, Android, iOS, Windows, Symbian, Tizen, Bada, or the like.

The program module 310 may include a kernel 320, middleware 330, an application programming interface (API) 360, and/or applications 370. At least some of the program module 310 may be preloaded in an electronic device or downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect the system resources. According to an embodiment of the present disclosure, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 330, for example, may provide a function utilized by the applications 370 in common or may provide various functions to the applications 370 through the API 360 so that the applications 370 may efficiently use limited system resources within the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335, for example, may include a library module, which a compiler uses in order to add a new function through a programming language while the applications 370 are being executed. The runtime library 335 may perform input/output management, memory management, or a function for an arithmetic function.

The application manager 341 may manage, for example, a life cycle of at least one of the applications 370. The block manager 342 may manage graphical user interface (GUI) resources used in a screen. The multimedia manager 343 may recognize formats utilized to reproduce various media files, and may perform an encoding or decoding of the media file by using a codec suitable for a corresponding format. The resource manager 344 may manage resources such as a source code, a memory, and a storage space of at least one of the applications 370.

The power manager 345 may, for example, operate together with a basic input/output system (BIOS) to manage a battery or power, and may provide power information utilized for the operations of the electronic device. The database manager 346 may generate, search for, or change a database to be used by at least one of the applications 370. The package manager 347 may manage the installation or updating of an application distributed in the form of a package file.

The connectivity manager 348 may manage wireless connection, for example, Wi-Fi or Bluetooth. The notification manager 349 may display or notify of an event such as a received message, an appointment, a proximity notification, and the like in such a way that does not disturb a user. The location manager 350 may manage location information of the electronic device. The graphic manager 351 may manage graphic effects to be provided to a user or user interfaces related to the graphic effects. The security manager 352 may provide all security functions utilized for system security, user authentication, or the like. According to an embodiment of the present disclosure, when the electronic device (e.g., the electronic device 101) has a telephone call function, the middleware 330 may further include a telephony manager that manages a voice or video call function of the electronic device.

The middleware 330 may include a middleware module for forming a combination of various functions of the aforementioned components. The middleware 330 may provide a module specialized for each type of operating system in order to provide a differentiated function. Further, the middleware 330 may dynamically remove some of the existing components or add new components.

The API 360 (e.g., the API 145) is, for example, a set of API programming functions, and a different configuration thereof may be provided according to an operating system. For example, one API set may be provided for each platform in the case of Android or iOS, and two or more API sets may be provided for each platform in the case of Tizen.

The applications 370 (e.g., the application programs 147) may include, for example, one or more applications that can perform functions, such as home 371, dialer 372, SMS/MMS 373, Instant Message (IM) 374, browser 375, camera 376, alarm 377, contacts 378, voice dialer 379, e-mail 380, calendar 381, media player 382, album 383, clock 384, health care (e.g., measuring the amount of exercise or blood sugar), or environment information (e.g., providing atmospheric pressure, humidity, temperature information or the like).

According to an embodiment of the present disclosure, the applications 370 may include an application (hereinafter, referred to as an "information exchanging application" for convenience of description) that supports exchanging information between the electronic device (e.g., the electronic device 101) and an external electronic device (e.g., the electronic device 102 or 104). The information exchanging application may include, for example, a notification relay application for transferring predetermined information to an external electronic device, or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, and the like) of the electronic device. Further, the notification relay application may receive notification information from, for example, an external electronic device and may provide the received notification information to a user.

The device management application may manage (e.g., install, delete, or update), for example, at least one function of an external electronic device (e.g., the electronic device 102 or 104) that communicates with an electronic device (e.g., turning on/off the external electronic device itself (or some components thereof) or adjusting brightness (or resolution) of a display), applications executed in the external electronic device, or services provided in the external electronic device (e.g., a telephone call service or a message service).

According to an embodiment of the present disclosure, the applications 370 may include applications (e.g., a health care application of a mobile medical appliance, or the like) designated according to the attributes of an external electronic device (e.g., the electronic device 102 or 104). According to an embodiment of the present disclosure, the applications 370 may include applications received from an external electronic device (e.g., the server 106 or the electronic device 102 or 104). According to an embodiment of the present disclosure, the applications 370 may include a preloaded application or a third party application that may be downloaded from a server. The names of the components of the program module 310, according to the embodiment illustrated in the drawing, may vary according to the type of operating system.

According to various embodiments of the present disclosure, at least a part of the programming module 310 may be embodied by software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, a process, or the like, for performing one or more functions.

Figure 4:
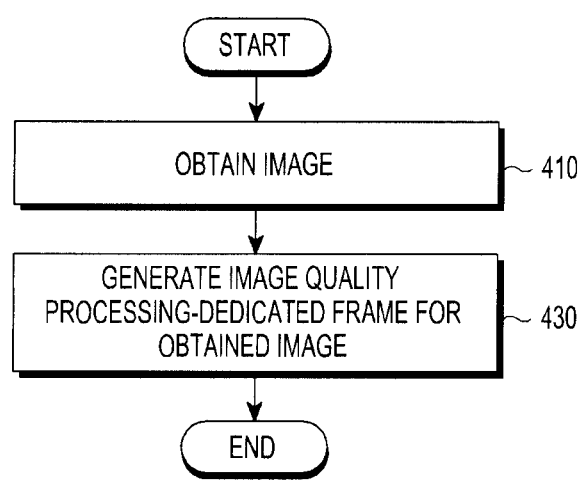
FIG. 4 is a flowchart illustrating an image processing operation of an electronic device according to various embodiments of the present disclosure.
Figure 5A:
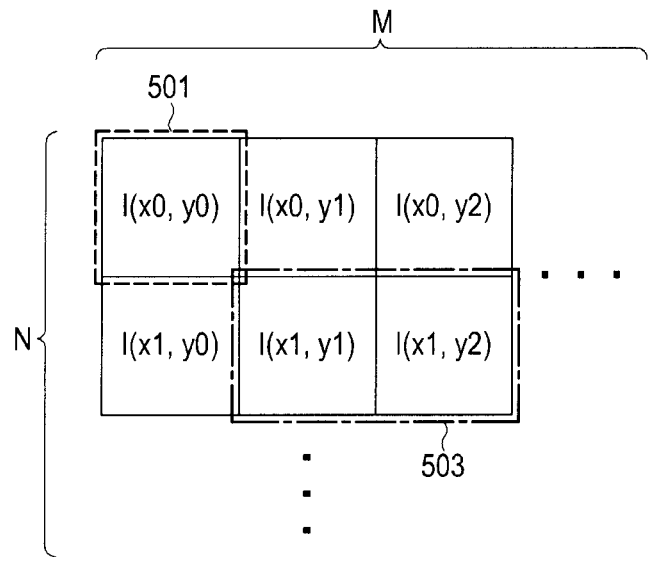
FIG. 5A and FIG. 5B are diagrams illustrating an image processing operation of an electronic device according to various embodiments of the present disclosure.
Figure 5B:
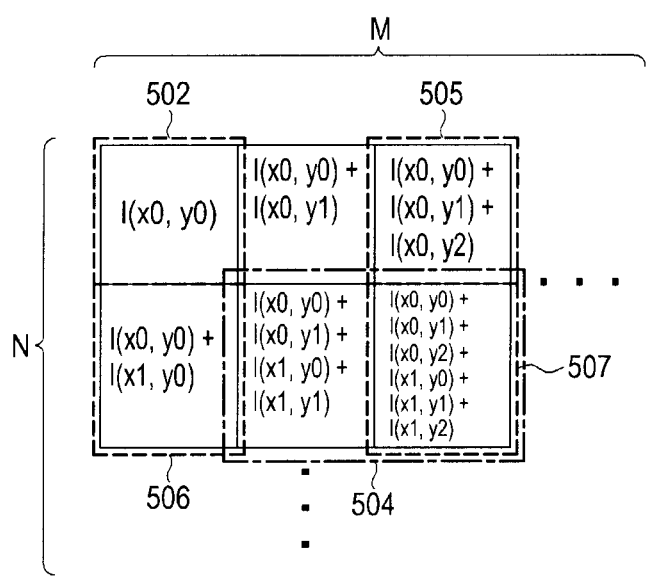

FIG. 4 is a flowchart illustrating an image processing operation of an electronic device (e.g., the electronic device 101) according to various embodiments of the present disclosure. FIGS. 5A and 5B are diagrams illustrating an image processing operation of an electronic device (e.g., the electronic device 101) according to various embodiments of the present disclosure.

In operation 410, the electronic device obtains an image through a camera module (e.g., capturing an image via the camera module 180).

In operation 430, the electronic device generates an image quality processing-dedicated frame with respect to the obtained image. For example, the electronic device may calculate, for each pixel of the obtained image, an accumulated-pixel value by adding up the pixel values of pixels in a quadrangular area that utilizes a corresponding pixel and a reference pixel of the frame as corners. Also, the electronic device may generate an image quality processing-dedicated frame of accumulated-pixel values including the calculated accumulated-pixel value corresponding to each pixel of the frame.

Referring to FIGS. 5A and 5B, a method of generating the image quality processing-dedicated frame is described as follows. From the obtained image, provided in a size of M×N including pixel values (I(x0, y0), I(x0, y1), ... I(x1, y2)) of some pixels (as illustrated in FIG. 5A), an image quality processing-dedicated image (corresponding to the obtained image) may be generated with respect to the obtained image (as illustrated in FIG. 5B), by applying a method of "accumulatively" adding up pixel values according to (or based on) a predetermined condition. By utilizing a pixel at (x0, y0) coordinate disposed in the obtained image of FIG. 5A as a reference pixel 501, and gradually enlarging a quadrangular area from a single quadrangular area that includes the reference pixel 501, an accumulated-pixel value of a pixel at a coordinate in the image quality processing-dedicated frame may be calculated, which corresponds to a pixel value of a pixel at each coordinate in the obtained image that may be thus calculated.

For example, when the quadrangular area is formed of solely of the reference pixel 501 at the (x0, y0) coordinate, an accumulated-pixel value 502 for the pixel at a coordinate corresponding to the (x0, y0) coordinate in the image quality processing-dedicated frame is I(x0, y0). Also, when the quadrangular area is formed by utilizing the reference pixel 501 at the (x0, y0) coordinate and a pixel at a (x0, y1) coordinate as corners, an accumulated-pixel value of a pixel at a coordinate that corresponds to the (x0, y1) coordinate, in the image quality processing-dedicated frame, is I(x0, y0)+I(x0, y1). Also, when the quadrangular area is formed by utilizing the reference pixel 501 at the (x0, y0) coordinate and a pixel at a (x0, y2) coordinate as corners, an accumulated-pixel value of a pixel at a coordinate that corresponds to the (x0, y2) coordinate, in the image quality processing-dedicated frame, is I(x0, y0)+I(x0, y1)+I(x0, y2). Also, when the quadrangular area is formed by utilizing the reference pixel 501 at the (x0, y0) coordinate and a pixel at a (x1, y0) coordinate as corners, an accumulated-pixel value of a pixel at a coordinate that corresponds to the (x1, y0) coordinate, in the image quality processing-dedicated frame, is I(x0, y0)+I(x1, y0). Also, when the quadrangular area is formed by utilizing the reference pixel 501 at the (x0, y0) coordinate and a pixel at a (x1, y1) coordinate as corners, an accumulated-pixel value of a pixel at a coordinate that corresponds to the (x1, y1) coordinate, in the image quality processing-dedicated frame, is I(x0, y0)+I(x0, y1)+I(x1, y0)+I(x1, y1). Also, when the quadrangular area is formed by utilizing the reference pixel 501 at the (x0, y0) coordinate and a pixel at a (x1, y2) coordinate as corners, an accumulated-pixel value of a pixel at a coordinate that corresponds to the (x1, y2) coordinate, in the image quality processing-dedicated frame, is I(x0, y0)+I(x0, y1)+I(x0, y2)+I(x1, y0)+I(x1, y1)+I(x1, y2).

By applying the above-described method, an accumulated-pixel value of each of the pixels of the remaining coordinates of the obtained image may be calculated. As illustrated in FIG. 5B, an image quality processing-dedicated frame provided in the form of an image having a size of M×N may be generated.

According to various embodiments of the present disclosure, an operation of calculating the accumulated-pixel value may include an operation of reducing the size of the obtained image by using sub-sampling (also known as down-sampling or decimation) or binning. For example, the operation of calculating the accumulated-pixel value may be applied to which the size is reduced.

According to various embodiments of the present disclosure, the operation of calculating the accumulated pixel value may include an operation of performing data processing on the obtained image so as to generate image quality data for the obtained image. For example, the operation of calculating the accumulated-pixel value may be applied to the data-processed frame. The operation of performing data processing on the obtained image has been described, and thus, the detailed descriptions thereof will be omitted.

According to various embodiments of the present disclosure, the electronic device (e.g., the electronic device 101) may obtain data of a predetermined area (hereinafter, referred to as a first quadrangular area), which includes at least one pixel, from the generated image quality processing-dedicated frame.

The operation of obtaining the data of the first quadrangular area may be performed through, for example, adding a second pixel that is in contact in the diagonal direction with a pixel that takes, as a boundary, a second corner disposed in the diagonal direction to a first corner in the first quadrangular area, out of the pixels outside the first quadrangular area, to a pixel value of a first pixel in the first quadrangular area that takes the first corner, which is the farthest from the reference pixel in the first quadrangular area, as a boundary; subtracting, from the sum, a third pixel that is in contact in the diagonal direction with a pixel that takes, as a boundary, a third corner in the first quadrangular area, out of the pixels outside the first quadrangular area; and subtracting, from the sum, a fourth pixel that is in contact in the diagonal direction with a pixel that takes, as a boundary, a fourth corner in the first quadrangular area, out of the pixels outside the first quadrangular area.

Referring to FIGS. 5A and 5B, a method of obtaining the data of the first quadrangular area will be described as follows.

For example, the data of the first quadrangular area 504 of the image quality processing-dedicated frame, which corresponds to a quadrangular area 503 including pixels at (x1, y1) and (x1, y2) coordinates, may be obtained as follows. When the pixel at the coordinate (x0, y0) is set as the reference pixel 501, the pixel value of pixel 502 (e.g., (x0, y0) is added to the pixel value of pixel 507 (e.g., (x1, y2)) to form a sum. Then, a pixel value of pixel 505 (e.g., (x0, y2)) and a pixel value of pixel 506 (e.g., (x1, y2) are subtracted from the sum, resulting in the data of the first quadrangular area 504 of the image quality processing-dedicated frame may be obtained.

The data of the first quadrangular area 504 of the image quality processing-dedicated frame may be determined as follows, with reference to FIG. 5B:
$\{I(x0, y0)+I(x0, y1)+I(x0, y2)+I(x1, y0)+I(x1, y1)+I(x1, y2)\}$ (e.g., pixel value at 507)
$+I(x0, y0)$ (e.g. pixel value at 502)
$-\{I(x0, y0)+I(x0, y1)+I(x0, y2)\}$ (e.g., pixel value at 505)
$-\{I(x0, y0)+I(x1, y0)\}$ (e.g. pixel value at 506)
$=I(x1, y1)+I(x1, y2)$.

According to the above described calculation, it can be recognized that the data of the first quadrangular area 504 of the image quality processing-dedicated frame is a value that is equal to image quality processing-dedicated data obtained by summing the pixel values of the corresponding quadrangular area 503 of the obtained image.

Figure 6:
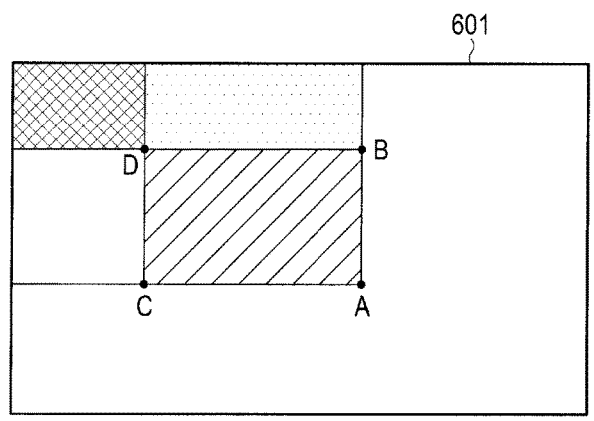
FIG. 6 is a diagram illustrating a method of obtaining data of a predetermined area from an image quality processing-dedicated frame according to various embodiments of the present disclosure.

Referring to FIG. 6, a method of obtaining the data of a predetermined area of an image quality processing-dedicated frame may be expressed as an equation. The data of a quadrangular area formed of A, B, C, and D in an image 601 may be obtained using Equation 1, as provided below:

$$\text{Value in } ABCD = ACC[A] - ACC[B] - ACC[C] + ACC[D] \quad \text{[Equation 1]}$$

"Value in ABCD" is the data (or data value) of a quadrangular area formed of A, B, C, and D. ACC[A] indicates the data of a pixel at a point A of an image quality processing-dedicated frame (e.g., the pixel value of a pixel in the quadrangular area that utilizes the point A as one of four corners). ACC[B] indicates the data of a pixel at a point B of the image quality processing-dedicated frame (e.g., the pixel value of a pixel in the quadrangular area that utilizes the point B as a corner). ACC[C] indicates the data of a pixel at a point C of the image quality processing-dedicated frame (e.g., the pixel value of a pixel in the quadrangular area that utilizes the point C as a corner). ACC[D] indicates the data of a pixel at a point D of the image quality processing-dedicated frame (e.g., the pixel value of a pixel in the quadrangular area that utilizes the point D as a corner).

Figure 7:
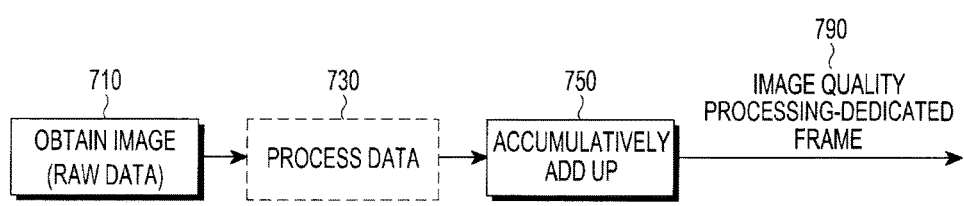
FIG. 7 is a flowchart illustrating an image processing operation of an electronic device according to various embodiments of the present disclosure.

FIG. 7 is a flowchart illustrating an image processing operation of an electronic device (e.g., the electronic device 101) according to various embodiments of the present disclosure.

In operation 710, the electronic device obtains an image through a camera module (e.g., capturing the image via the camera module 180).

In operation 730, to generate image quality data of the obtained image, the electronic device performs data processing on the frame.

In operation 750, the electronic device generates an image quality processing-dedicated frame 790 by accumulatively adding up pixel values based on a predetermined condition in the data-processed frame.

Operations 730 to 750 may be respectively identical to the data processing operation and the operation of generating an image quality processing-dedicated frame based on an accumulative summation, which have been described with reference to FIGS. 4 to 6.

Figure 8:
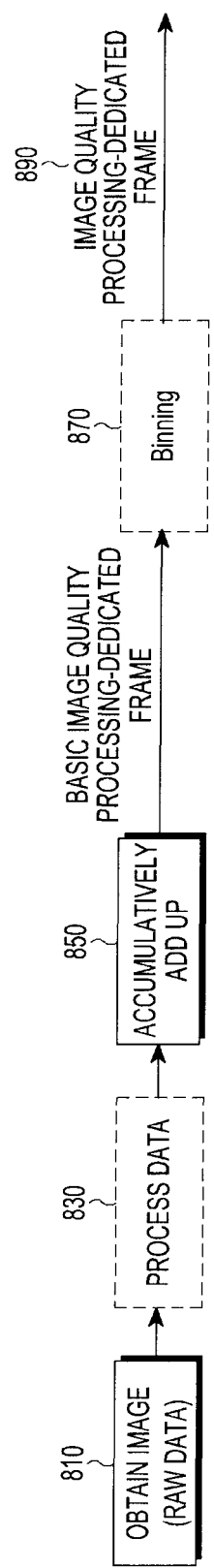
FIG. 8 is a flowchart illustrating an image processing operation of an electronic device according to various embodiments of the present disclosure.

FIG. 8 is a flowchart illustrating an image processing operation of an electronic device (e.g., the electronic device 101) according to various embodiments of the present disclosure.

In operation 810, the electronic device obtains an image through a camera module (e.g., captured via the camera module 180).

In operation 830, to generate image quality data of the obtained image, the electronic device performs data processing on the frame.

Figure 9:
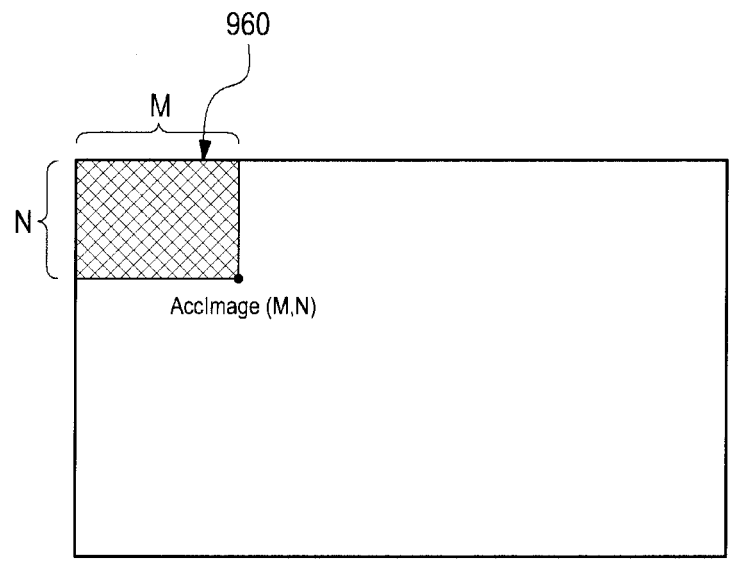
FIG. 9 is a diagram illustrating a basic image quality processing-dedicated frame generated by an image processing operation of an electronic device according to various embodiments of the present disclosure.

In operation 850, the electronic device generates a basic image quality processing-dedicated frame 860 (e.g., the image quality processing-dedicated frame 790) by accumulatively adding up pixel values based on a predetermined condition in the data-processed frame. For example, referring to FIG. 9, a basic image quality processing-dedicated frame 960 (AccImage (M,N); e.g., the basic image quality processing-dedicated frame 860) may have a size of M×N. The size may be equal to that of the obtained image.

In the same manner as operations 730 to 750, operations 830 to 850 may be respectively identical to the data processing operation and the operation of generating an image quality processing-dedicated frame based on an accumulative summation, which have been described with reference to FIGS. 4 to 6.

Figure 10:
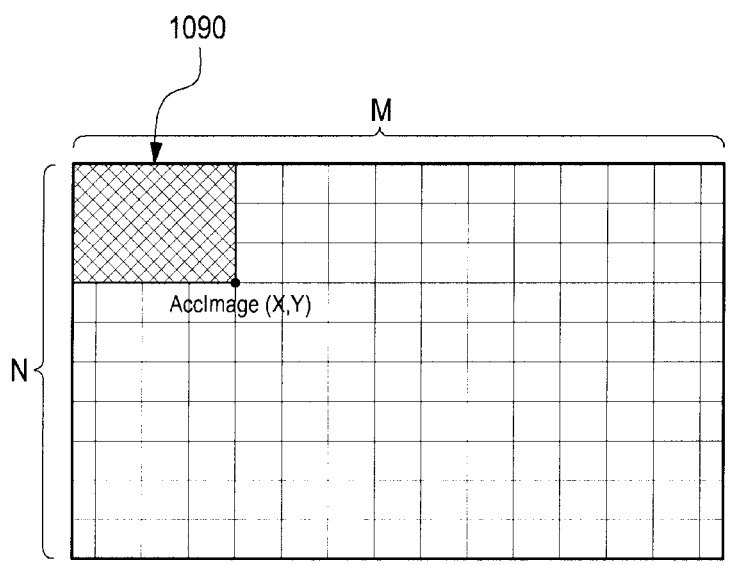
FIG. 10 is a diagram illustrating a basic image quality processing-dedicated frame of which the size is reduced by an image processing operation of an electronic device according to various embodiments of the present disclosure.

In operation 870, the electronic device reduces the size of the generated basic image quality processing-dedicated frame 860 using binning, so as to generate the image quality processing-dedicated frame 890 for which the size is reduced. For example, referring to FIG. 10, a reduced image quality processing-dedicated frame 1090 (AccImage(X,Y)); e.g., the image quality processing-dedicated frame 890) may be generated by reducing the basic image quality processing-dedicated frame (e.g., the basic image quality processing-dedicated frame 860) provided in a size of M×N to a size of X×Y.

According to various embodiments of the present disclosure, an image processing method of an electronic device may include: obtaining an image through a camera module of the electronic device; generating an image quality processing-dedicated frame with respect to the obtained image using the obtained image; and setting a first region of interest in the obtained image or setting a second region of interest having a size or location that is different from at least one of a size and location of the first region of interest, by using the generated image quality processing-dedicated frame.

The data of the first region of interest is obtained by: adding a second pixel that is in contact in the diagonal direction with a pixel that takes, as a boundary, a second corner disposed in the diagonal direction to a first corner in the first region of interest, out of the pixels outside the first region of interest, to a pixel value of a first pixel in the first region of interest that takes the first corner, which is the farthest from the reference pixel in the first region of interest, as a boundary; subtracting, from the sum, a third pixel that is in contact in the diagonal direction with a pixel that takes, as a boundary, a third corner in the first region of interest, out of the pixels outside the first region of interest; and subtracting, from the sum, a fourth pixel that is in contact in the diagonal direction with a pixel that takes, as a boundary, a fourth corner in the first region of interest, out of the pixels outside the first region of interest.

The data of the second region of interest is obtained by: adding a sixth pixel that is in contact in the diagonal direction with a pixel that takes, as a boundary, a sixth corner disposed in the diagonal direction to a fifth corner in the second region of interest, out of the pixels outside the second region of interest, to a pixel value of a fifth pixel in the second region of interest that takes, as a boundary, the fifth corner which is the farthest from the reference pixel in the second region of interest; subtracting, from the sum, a seventh pixel that is in contact in the diagonal direction with a pixel that takes, as a boundary, a seventh corner in the second region of interest, out of the pixels outside the second region of interest; and subtracting, from the sum, an eighth pixel that is in contact in the diagonal direction with a pixel that takes, as a boundary, an eighth corner in the second region of interest, out of the pixels outside the second region of interest.

According to the above described embodiments of the present disclosure, an image quality processing-dedicated frame with respect to an image shot by a camera is generated, and by using the generated image quality processing-dedicated frame, image processing for improving the image quality of an image obtained by the camera (or for generating image quality data of an image obtained through the camera) may be efficiently performed.

Figure 11:
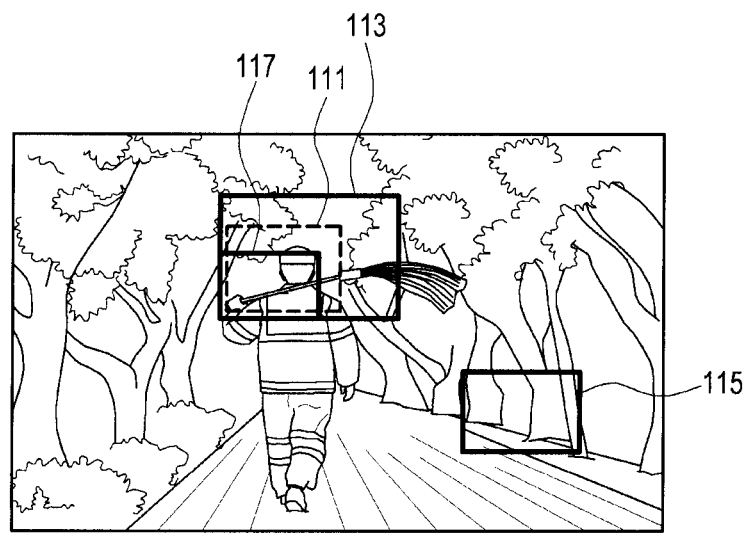
FIG. 11, FIG. 12, and FIG. 13 are diagrams illustrating an example of using a basic image quality processing-dedicated frame, which is generated by an image processing operation of an electronic device according to various embodiments of the present disclosure.

For example, referring to FIG. 11, when an image quality processing-dedicated frame exists, which is generated with respect to an image obtained through a camera, the 3A algorithm for image quality processing may be accurately controlled. For example, when a first block 111 is set in the image of FIG. 11 by predicting an area using data of image quality processing executed in advance, a block 113 and 117 may be generated by enlarging or reducing the area of the first block 111 using the generated image quality processing-dedicated frame, or a block 115 may be newly generated in another area, and thus, data in a block may be readily obtained. Accordingly, the 3A algorithm may be implemented flexibly.

Figure 12:
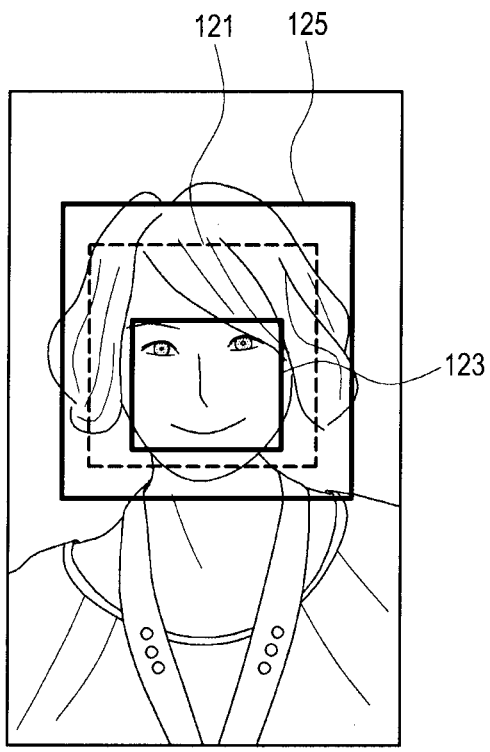

Also, for example, referring to FIG. 12, in the situation in which a face in an image obtained through a camera is recognized using a facial recognition technology, when the coordinates of a recognized area (e.g., where first block 121 is to be set) are provided, the recognized area 121 may be set as a first block 121 and image processing may be performed using the data of the first block 121. However, according to embodiments of the present disclosure, the reliability of the first block 121 is attempted to be determined, and the reliability of a second block 123 generated through enlarging the area of the first block 121 is attempted to be determined, and/or the reliability of a third block 125 generated through reducing the area of the first block 121 is attempted to be determined. These may be used to increase the accuracy of the 3A algorithm.

Figure 13:
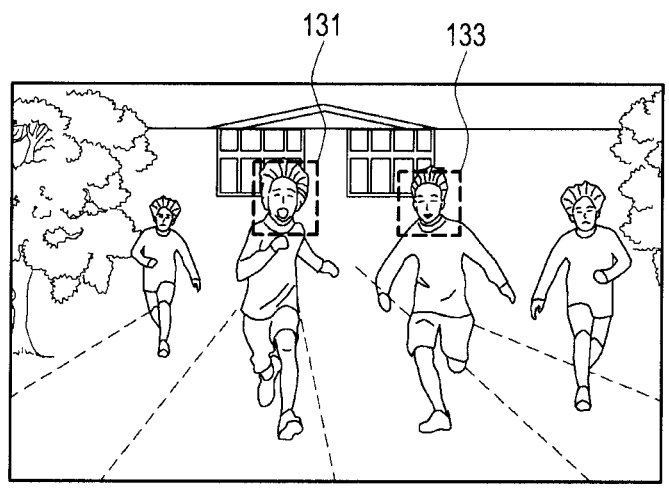

Also, for example, when a video is captured using a camera, as illustrated in FIG. 13, it is beneficial to quickly and accurately detect a block (or a plurality of blocks 131 and 133) to track a subject. Generally, to track a subject in live video via a camera, one may predict a block of an image to be subsequently obtained, or predict the movement of the subject to detect the location of a focus of the image. In one example, the data of a block is detected in at least 2VD time after the block is set, and thus, errors easily occur in setting an area. However, according to the embodiments of the present disclosure, when a predicted block area is an incorrectly predicted area, it is possible to quickly move an area and to apply an image quality algorithm, allowing a subject to be quickly and accurately tracked.

Figure 14:
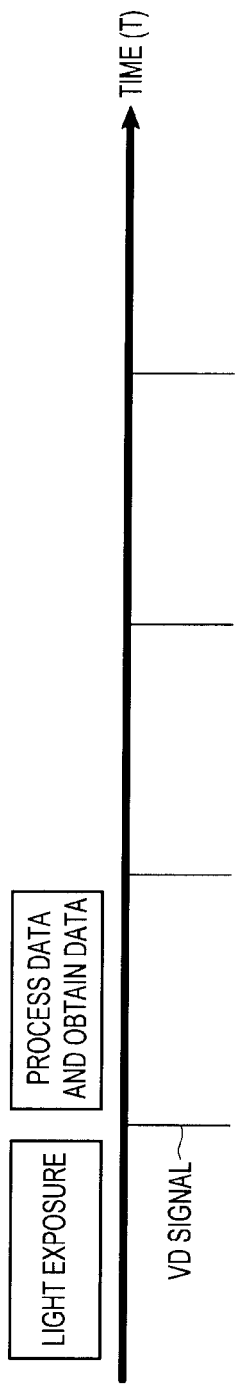
FIG. 14 is a diagram illustrating an operating time of an image processing operation of an electronic device according to various embodiments of the present disclosure.
Figure 15A:
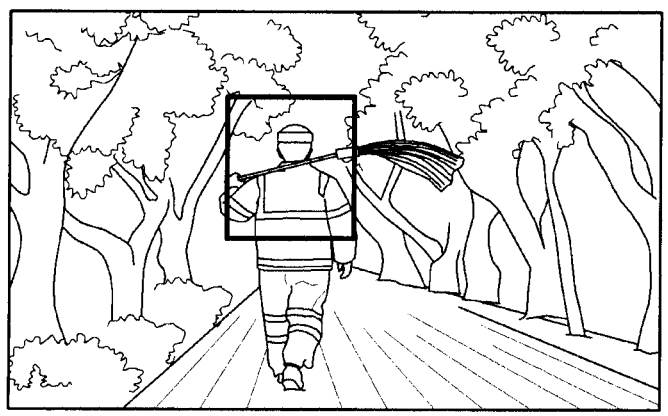
FIG. 15A and FIG. 15B are diagrams illustrating a block that is set in an image.
Figure 15B:
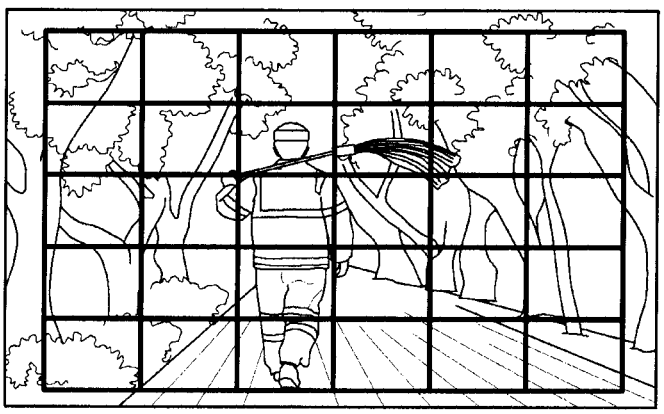
Figure 16:
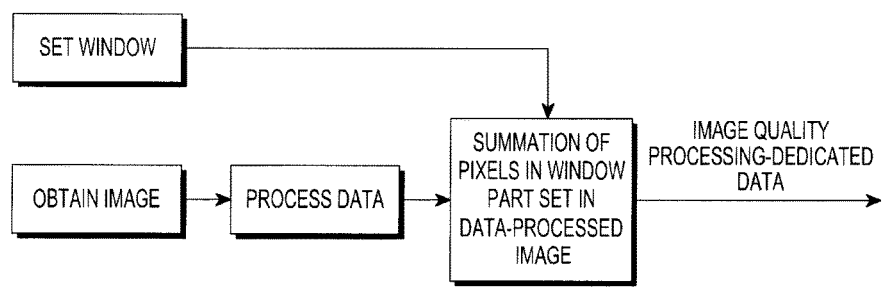
FIG. 16 is a flowchart illustrating an image processing operation of an electronic device.
Figure 17:
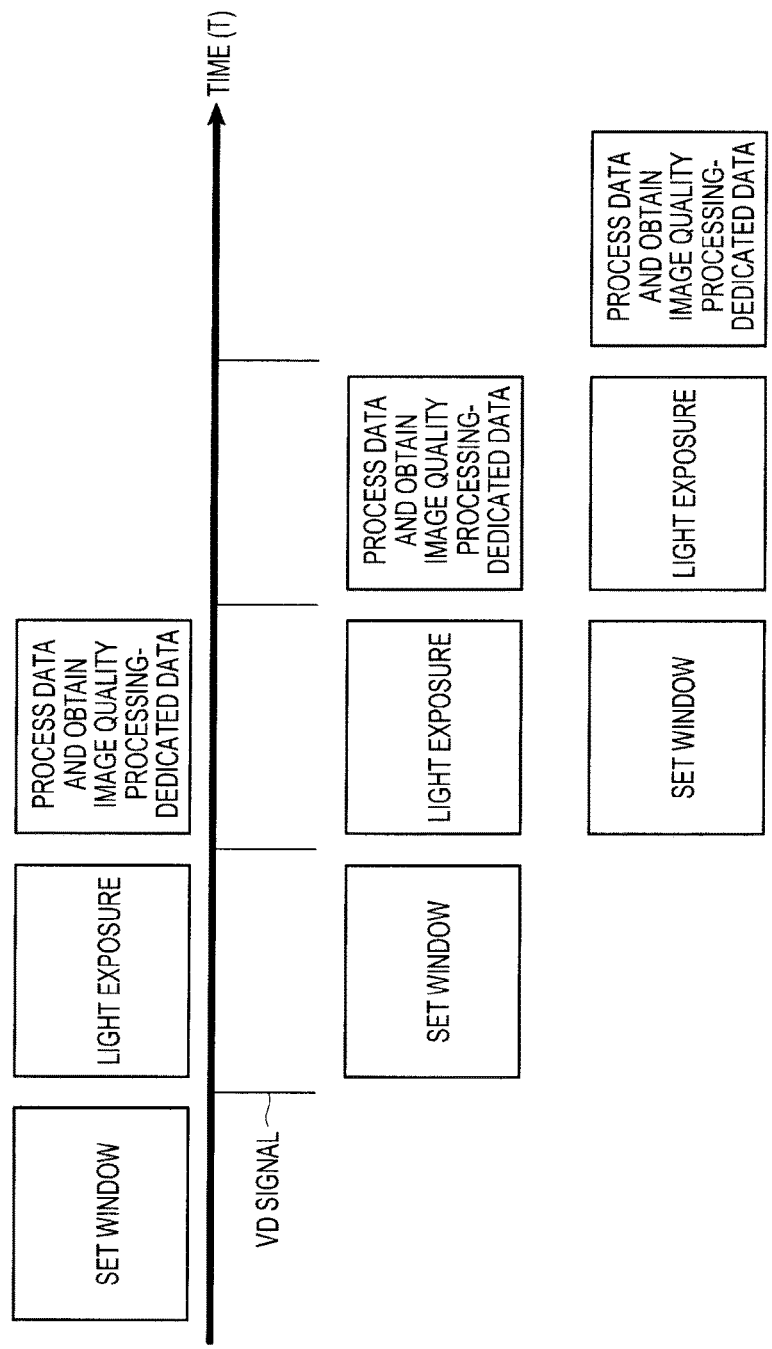
FIG. 17 is a diagram illustrating an operating time of an image processing operation of an electronic device.
Figure 18:
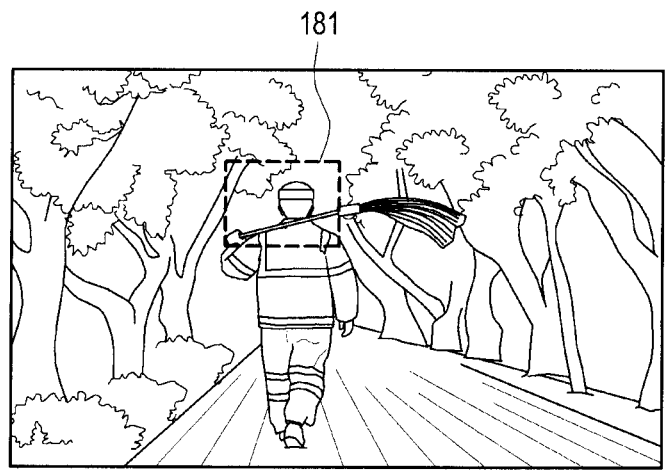
FIG. 18 is a diagram illustrating a block that is capable of being set in an image.
Figure 18:
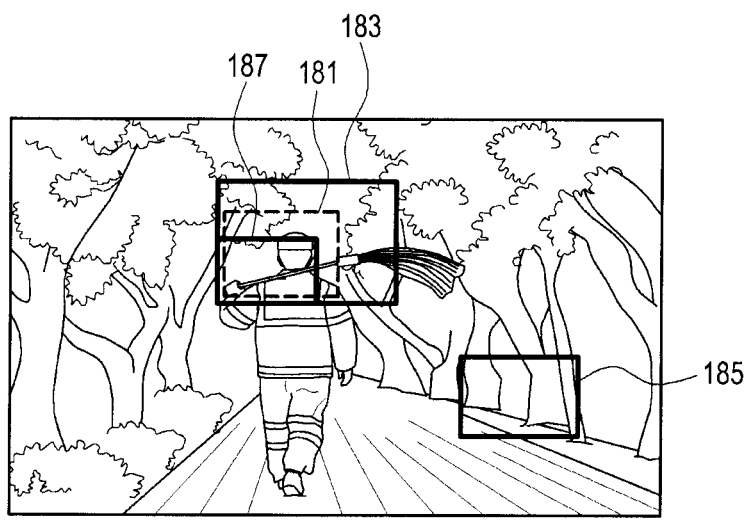

FIG. 14 is a diagram illustrating an operating time of an image processing operation of an electronic device according to various embodiments of the present disclosure. As seen therein, according to a time (T), a vertical drive (VD) signal is generated after light exposure. After the VD signal, data is processed and obtained.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the present disclosure. Therefore, it should be construed that all modifications and changes or modified and changed forms based on the technical idea of the present disclosure fall within the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device, comprising:
   a camera that obtains an image;
   at least one processor; and
   memory storing programming instructions executable by the at least one processor to cause the electronic device to:
   set a quadrangular area in the obtained image including a reference pixel and a corresponding pixel disposed respectively at corners of the quadrangular area,
   calculate an accumulated-pixel value for each pixel of the obtained image corresponding to the quadrangular area including a lower-right corner pixel, an upper-left corner pixel, an upper-right corner pixel, and a lower-left corner pixel, such that a particular pixel value for a particular pixel is a sum of the pixel values beginning from the reference pixel, continuing through an arrangement of pixels in the quadrangular area and terminating at the particular pixel; and
   generate an image quality processing-dedicated frame of accumulated-pixel values based on calculated accumulated-pixel values of each pixel of the frame,
   wherein calculating the accumulated-pixel value includes adding pixel values of the lower-right corner pixel to the upper-left corner pixel and subtracting pixel values of the upper-right corner pixel and lower-left corner pixel.

2. The electronic device of claim 1, wherein the programming instructions are further executable by the at least one processor to reduce a size of the generated image quality processing-dedicated frame using at least one of sub-sampling and binning.

3. The electronic device of claim 1, wherein the programming instructions are further executable by the at least one processor to reduce a size of the frame using at least one of sub-sampling and binning.

4. The electronic device of claim 1, wherein the programming instructions are further executable by the at least one processor to perform data processing on the frame to generate image quality data associated with the frame.

5. The electronic device of claim 4, wherein the image quality data includes at least one of auto focus (AF) data, auto white balance (AWB) data, and auto exposure (AE) data.

6. An image processing method for an electronic device, comprising:
   obtaining an image through a camera of the electronic device;
   setting a quadrangular area in the obtained image including a reference pixel and a corresponding pixel disposed respectively at corners of the quadrangular area;
   calculating an accumulated-pixel value for each pixel of the obtained image corresponding to the quadrangular area including a lower-right corner pixel, an upper-left corner pixel, an upper-right corner pixel, and a lower-left corner pixel, such that a particular pixel value for a particular pixel is a sum of the pixel values beginning from the reference pixel, continuing through an arrangement of pixels in the quadrangular area and terminating at the particular pixel; and
   generating an image quality processing-dedicated frame of accumulated-pixel values based on calculated accumulated-pixel values of each pixel of the frame,
   wherein calculating the accumulated-pixel value includes adding pixel values of the lower-right corner pixel to the upper-left corner pixel and subtracting pixel values of the upper-right corner pixel and lower-left corner pixel.

7. The method of claim 6, further comprising:
   reducing a size of the generated image quality processing-dedicated frame using at least one of sub-sampling and binning.

8. The method of claim 6, wherein the calculating of the accumulated-pixel value comprises:
   reducing a size of the frame using at least one of sub-sampling and binning.

9. The method of claim 6, wherein the calculating of the accumulated-pixel value comprises:
   performing data processing on the frame to generate image quality data associated with the frame.

10. The method of claim 9, wherein the image quality data includes at least one of auto focus (AF) data, auto white balance (AWB) data, and auto exposure (AE) data.

11. An electronic device, comprising:
    a camera that obtains an image;
    at least one processor; and memory storing programming instructions executable by the at least one processor to cause the electronic device to:
generate an image quality processing-dedicated frame with respect to the obtained image based on the obtained image, and
set at least one of:
a first region of interest disposed within the obtained image using the generated image quality processing-dedicated frame, and
a second region of interest having a size or disposed at a location differing from at least one of a size and location of the first region of interest, respectively, and
set a quadrangular area in the obtained image including a reference pixel and a corresponding pixel disposed respectively at corners of the quadrangular area,
wherein the first region of interest includes the quadrangular area, and the programming instructions are further executable by the at least one processor to obtain data of the first region of interest from the generated image quality processing-dedicated frame by:
adding a first pixel value of a first pixel disposed at a first corner of the quadrangular area to a second pixel value of a second pixel disposed at a second corner of the quadrangular area, the first corner diagonally opposite the second corner, and the first pixel disposed farther from the reference pixel among all pixels in the first region of interest, and
subtracting, from the sum of the first pixel value and the second pixel value, both a third pixel value of a third pixel disposed at a third corner of the quadrangular area and a fourth pixel value of a fourth pixel disposed at a fourth corner of the quadrangular area.

12. The electronic device of claim 11, wherein the programming instructions are further executable by the at least one processor to perform:
calculating, for each pixel of the frame, an accumulated-pixel value such that a particular pixel value for a particular pixel is a sum of the pixel values beginning from the reference pixel, continuing through an arrangement of pixels in the quadrangular area and terminating at the particular pixel; and
generating the image quality processing-dedicated frame including accumulated-pixel values based on calculated accumulated-pixel values for each pixel of the obtained image.

13. The electronic device of claim 12, wherein the programming instructions are further executable by the at least one processor to reduce a size of the generated image quality processing-dedicated frame using at least one of sub-sampling and binning.

14. The electronic device of claim 12, wherein second region of interest includes the quadrangular area, and the processor is configured to obtain data of the second region of interest from the generated image quality processing-dedicated frame by:
adding a first pixel value of a first pixel disposed at a first corner of the quadrangular area to a second pixel value of a second pixel disposed at a second corner of the quadrangular area, the first corner diagonally opposite the second corner, and the first pixel disposed farther from the reference pixel among all pixels in the first region of interest, and
subtracting, from the sum of the first pixel value and the second pixel value, both a third pixel value of a third pixel disposed at a third corner of the quadrangular area and a fourth pixel value of a fourth pixel disposed at a fourth corner of the quadrangular area.

15. An image processing method of an electronic device, comprising:
obtaining an image through a camera of the electronic device;
generating an image quality processing-dedicated frame with respect to the obtained image based on the obtained image; and
setting at least one of:
a first region of interest disposed within the obtained image using the generated image quality processing-dedicated frame, and
a second region of interest having a size or disposed at a location differing from at least one of a size and location of the first region of interest, respectively,
setting a quadrangular area in the obtained image including a reference pixel and a corresponding pixel disposed respectively at corners of the quadrangular area,
wherein the first region of interest includes the quadrangular area, and data of the first region of interest is obtained from the generated image quality processing-dedicated frame by:
adding a first pixel value of a first pixel disposed at a first corner of the quadrangular area to a second pixel value of a second pixel disposed at a second corner of the quadrangular area, the first corner diagonally opposite the second corner, and the first pixel disposed farther from the reference pixel among all pixels in the first region of interest, and
subtracting, from the sum of the first pixel value and the second pixel value, both a third pixel value of a third pixel disposed at a third corner of the quadrangular area and a fourth pixel value of a fourth pixel disposed at a fourth corner of the quadrangular area.

16. The method of claim 15, wherein the generating of the image quality processing-dedicated frame comprises:
calculating, for each pixel of the frame, an accumulated-pixel value such that a particular pixel value for a particular pixel is a sum of the pixel values beginning from the reference pixel, continuing through an arrangement of pixels in the quadrangular area and terminating at the particular pixel; and
generating the image quality processing-dedicated frame including accumulated-pixel values based on calculated accumulated-pixel values for each pixel of the frame.

17. The method of claim 16, further comprising:
reducing the size of the generated image quality processing-dedicated frame using at least one of sub-sampling and binning.

18. The method of claim 16, wherein second region of interest includes the quadrangular area, and the data of the second region of interest is obtained from the generated image quality processing-dedicated frame by:
adding a first pixel value of a first pixel disposed at a first corner of the quadrangular area to a second pixel value of a second pixel disposed at a second corner of the quadrangular area, the first corner diagonally opposite the second corner, and the first pixel disposed farther from the reference pixel among all pixels in the first region of interest, and
subtracting, from the sum of the first pixel value and the second pixel value, both a third pixel value of a third pixel disposed at a third corner of the quadrangular area and a fourth pixel value of a fourth pixel disposed at a fourth corner of the quadrangular area.

\* \* \* \* \*